US007463193B2

(12) United States Patent
Brunasso et al.

(10) Patent No.: US 7,463,193 B2
(45) Date of Patent: Dec. 9, 2008

(54) BEAM FORMING SYSTEM

(75) Inventors: Theresa Brunasso, Snellville, GA (US); John Daniel Voss, Cumming, GA (US); David Elton Finch, Duluth, GA (US); Wyman Williams, Duluth, GA (US); Christopher Lee Burton, Suwanee, GA (US); John L. Beafore, Duluth, GA (US)

(73) Assignee: EMS Technologies, Inc., Norcross, GA (US)

( * ) Notice: Subject to any disclaimer, the term of this patent is extended or adjusted under 35 U.S.C. 154(b) by 140 days.

(21) Appl. No.: 11/415,321

(22) Filed: May 1, 2006

(65) Prior Publication Data

US 2007/0252759 A1 Nov. 1, 2007

(51) Int. Cl.
*G01S 3/16* (2006.01)

(52) U.S. Cl. ...................................... 342/383; 342/372

(58) Field of Classification Search .................. 342/81, 342/354, 368, 372, 373, 383
See application file for complete search history.

(56) References Cited

U.S. PATENT DOCUMENTS

| | | | | |
|---|---|---|---|---|
| 5,038,150 | A * | 8/1991 | Bains | 342/373 |
| 6,320,537 | B1 | 11/2001 | Chien et al. | |
| 7,099,528 | B2 * | 8/2006 | Benner et al. | 385/24 |

* cited by examiner

*Primary Examiner*—Dao L Phan
(74) *Attorney, Agent, or Firm*—King & Spalding

(57) ABSTRACT

A compact system can use modular components to enhance the isolation or quality of signals that an antenna array produces. The system can comprise an array of input coupler modules and an array of output coupler modules respectively on the input and output sides of a signal routing device. Each input coupler module can receive a signal from a specific element in the antenna array and can divide or split that received signal into a multiple signal components, such as seven. The signal routing device can route each of those signal components to a different output coupler module in the array of output coupler modules. Thus, each output coupler module can receive and combine multiple signal components, such as seven, from different input coupler modules. The signal routing device can include a readily manufacturable phase trimming section to compensate for phase mismatches.

20 Claims, 8 Drawing Sheets

BEAM FORMING SYSTEM

FIELD OF THE INVENTION

The present invention relates to managing electromagnetic signals from an antenna array and more specifically to a system of modular components that reduces sidelobes by extracting signals from the output line of each antenna array element and feeding those extracted signals to the output lines of other antenna array elements.

BACKGROUND

Many types of antenna systems comprise arrays of antenna elements that each collects or emits electromagnetic radiation. For example, an array of antenna horns can be used to acquire signals in a space, airborne, or terrestrial application, such as on a satellite, an aircraft, or a fixed tower. In such applications, multiple-beam antennas have multiple feed elements that form multiple communication beams.

Disposed in an orbiting satellite, an array of receiving horns can be pointed towards the ground so that each horn has a field of reception that is centered on a different geographic area of the Earth. In this scenario, the geographic coverage of each horn overlaps the coverage of adjacent horns. That is, each horn in the array receives signals not only from a primary geographic region, but also from the reception areas of adjacent horns. The overlapping coverage often results in isolation issues between the various antenna horns. Moreover, the signals from various antenna elements can exhibit undesirable sidelobes associated with degraded isolation, interference, cross-coupling, or some other extraneous effect.

One proposed method for addressing signal degradation in antenna array applications involves extracting energy from the output line of each antenna array element and feeding that extracted energy to the output lines of adjacent antenna array elements. When applied to the output line of an adjacent antenna element, the extracted energy interacts with the signals propagating thereon to improve signal fidelity. In other words, "tapping off" a fraction of each antenna signal and adding the tapped-off signals to other antenna signals is a known technique for suppressing sidelobes. Thus, mixing the signals output by the various antenna elements can improve the quality of the individual signals.

However, the conventional technologies that are available for implementing the signal mixing are generally lacking in terms of manufacturability and therefore offer limited commercial appeal. For example, one conventional technology for handling the signals employs a complex, intertwined system of waveguide plumbing to implement signal extraction, routing, and combining. That is, conventional systems typically comprise a network of waveguide tubes that are bent and fused to cross-couple energy among one another. The waveguide plumbing typically extracts signal energy from each antenna line and divides that extracted energy among six other antenna lines so that each line is in communication with other tapped waveguides. In applications involving large arrays of antenna elements, bending and joining numerous pieces of waveguide tubing to fabricate such a complex system is often not economically feasible.

To address these representative deficiencies in the art, what is needed is an improved capability for improving isolation and suppressing sidelobes of signals associated with an antenna array or a multiple-bean antenna. Another need exists for an improved system for extracting energy or signals from an antenna output line and for feeding the extracted signals to adjacent antenna output lines. Yet another need exists for a modular and/or manufacturable system for managing signals associated with an antenna array. A capability addressing one or more of these needs would help provide signals with improved fidelity in multi-beam or multi-element antenna applications.

SUMMARY OF THE INVENTION

The present invention supports enhancing the quality or fidelity of the signals produced by each antenna element in an array of antenna elements. Improving signal quality can comprise reducing signal sidelobes, which generally are the portions of the response of an antenna that lie outside the antenna's main response beam. Thus, the present invention supports improving the isolation of each antenna element from adjacent antenna elements.

In one aspect of the present invention, a system or network can manage interactions among electromagnetic beams or energy patterns associated with an antenna array. The system can comprise modules, components, or elements that split, route, or combine signals associated with the antenna array. An array of input coupler modules can be linked to, disposed on, attached to, or connected with an input side of a signal routing device. Each input coupler module can be a device that splits or divides incoming signals into multiple signals. For example, each input coupler module can receive a signal from a specific element in the antenna array and can divide or split that received signal into a plurality of signal components, such as seven. An array of output coupler modules can be linked to, disposed on, attached to, or connected with an output side of the signal routing device. Each output coupler module can be a device that combines or adds a plurality of signals, for example to form a unified or aggregate signal. The signal routing device can receive each of the signal components that each of the input coupler modules produces and can route or guide each of those signal components to a different coupler module in the array of coupler modules. Each output coupler module in the array of output coupler modules can receive a plurality, such as seven, signal components, from different input coupler modules. Each output coupler module can combine the signal components that it receives to produce a signal that exhibits enhanced signal quality or fidelity.

The discussion of managing antenna signals presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Figure 1:
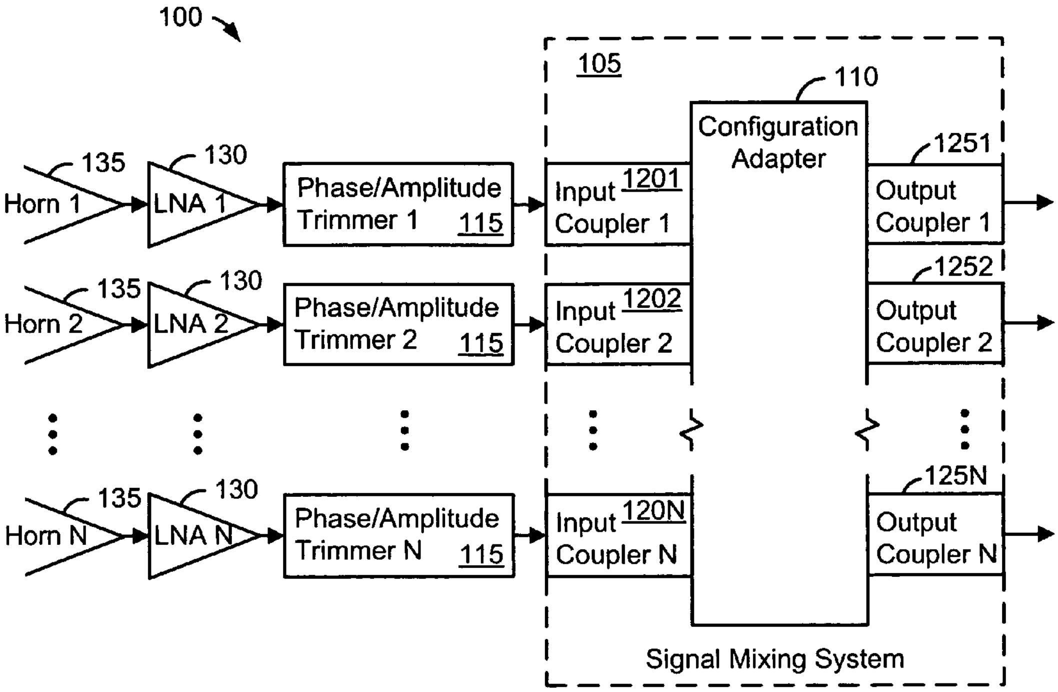
FIG. 1 is a functional block diagram of an exemplary antenna system in accordance with an embodiment of the present invention.

Many aspects of the invention can be better understood with reference to the above drawings. The components in the drawings are not necessarily to scale, emphasis instead being placed upon clearly illustrating the principles of exemplary embodiments of the present invention. Moreover, in the drawings, reference numerals designate like or corresponding, but not necessarily identical, elements throughout the several views.

DETAILED DESCRIPTION OF EXEMPLARY EMBODIMENTS

The present invention supports improving the quality and/or isolation of signals output by antenna elements, such as horns, of a multi-element or multi-beam antenna system. A system for managing and enhancing the quality of antenna signals can comprise modular components that are readily manufactured and that can be scalable to handle large antenna arrays.

A system for managing signals from an antenna array will now be described more fully hereinafter with reference to FIGS. 1-7, which show representative embodiments of the present invention. FIGS. 1, 2A, 3, 4, 6A, and 6B provide views involving two or more components of the system. FIGS. 2B, 2C, 5A, 5B, 5C, 7A, and 7B largely describe individual modules of the system.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates a functional block diagram of an antenna system 100 according to an exemplary embodiment of the present invention. In one exemplary embodiment, the system 100 is disposed above the Earth, for example in a space craft, a satellite, or an aircraft. The system 100 can also be used in stationary or mobile terrestrial applications, for example mounted on a tower or at some fixed site.

The system 100 comprises an array of antenna horns 135 that receive signals emanating from some distant locations or remote sites. While a variety of geometries and configurations are supported, the array of horns 135 typically comprises a two-dimensional array of antenna elements.

In the exemplary space application, the antenna horns 135 typically point towards the Earth, with each horn 135 directed to a distinct geographic location. In other words, each horn 135 has field of receptivity that includes an area of the ground below. Those fields of receptivity typically have overlapping peripheries. In one exemplary embodiment, each field of receptivity has a ground diameter of approximately 20 miles. Thus, each antenna horn 135 may collect signals not only from a specified target area, but also from the edges of neighboring target areas of adjacent antenna horns 135. Such unwanted sharing or mixing of signals can produce sidelobes that degrade signal quality. The sidelobes of each antenna horn 135 can be the portions of the antenna's response that lie outside the antenna's main response beam or main field of receptivity.

The system 100 manages or handles the signals from the horns 135 to suppress, eliminate, cancel, or otherwise address the sidelobes. That is, the system 100 improves the isolation of each horn antenna element 135 and/or increases signal quality or fidelity.

In various exemplary embodiments, the horns 135 can receive signals or electromagnetic ("EM") energy. The energy can comprise microwave energy, millimeter-wave energy, radio waves, radio frequency ("RF") energy, electromagnetic radiation, infrared radiation, visible radiation, light, cellular signals, extremely low frequency ("ELF") signals, super low frequency ("SLF") signals, ultra low frequency ("ULF") signals, very low frequency ("VLF") signals, low frequency ("LF") signals; medium frequency ("MF") signals, high frequency ("HF") signals, very high frequency ("VHF") signals, super high frequency ("SHF") signals, ultra high frequency ("UHF") signals, etc.

In one exemplary embodiment, the horns 135 handle electromagnetic energy in the range of 43.5 to 45.5 gigahertz. In one exemplary embodiment, the horns 135 can receive electromagnetic signals that have a wavelength of approximately 0.265 inches or 6.73 millimeters.

In one exemplary embodiment, the horns 135 are operative to transmit or emit electromagnetic energy. In one exemplary embodiment, the system 100 couples to a receiving unit at the output-coupler-side of the signal mixing system 105. In one exemplary embodiment, the system 100 functions in a bidirectional capacity.

Each horn 135 is coupled to and feeds a low noise amplifier ("LNA") 130 that amplifies incoming signals and outputs amplified signals to a phase or amplitude trimmer 115. The phase or amplitude trimmers 115 provide variable levels of phase or amplitude adjustment. The phase or amplitude trimmers 115 feed the respective horn signals to the signal mixing system 105.

In one exemplary embodiment, the phase or amplitude trimmers 115 support adjusting or trimming the relative phases of the respective antenna array signals. Setting the phase relationships among the various antenna array signals can facilitate canceling the portions of the signals associated with unwanted sidelobes. With the appropriate adjustments, the signals applied to correct sidelobes are 180 degrees out-of-phase with respect to the portions of the signals that carry those sidelobes. In this manner, signals destructively interfere with one another.

As discussed in further detail below, the signal mixing system 105 splits the signals of each horn 135 into signal components, fractions, elements, or constituents and mixes the signal components of the various horns 135 in a manner that improves isolation. U.S. Pat. No. 6,320,537, entitled "Beam Forming Network Having a Cell Reuse Pattern and Method for Implementing Same," discloses a method for mixing signals from individual elements of an antenna system to improve signal quality. In one exemplary embodiment of the present invention, the system 100 enhances signal isolation via implementing a method for mixing signals following steps disclosed in U.S. Pat. No. 6,320,537, the entire contents of which are hereby incorporated herein by reference.

The signal mixing system 105 comprises multiple input couplers 1201, 1202, . . . 120N, a configuration adapter 110, and multiple output couplers 1251, 1252, . . . 125N. The input couplers 1201, 1202, . . . 120N can be viewed as an array or a plurality of devices that split or divide energy or signals. The output couplers 1251, 1252, . . . 125N can be viewed as an array or a plurality of devices that combine or integrate energy or signals. The configuration adapter 110 can be viewed as an exemplary embodiment of a signal routing device or a waveguide network. The input couplers 1201, 1202, . . . 120N are mounted on the input side of the configuration adapter 110, while the output couplers 1251, 1252, . . . 125N are mounted on the output side of the configuration adapter 110.

Figure 2A:
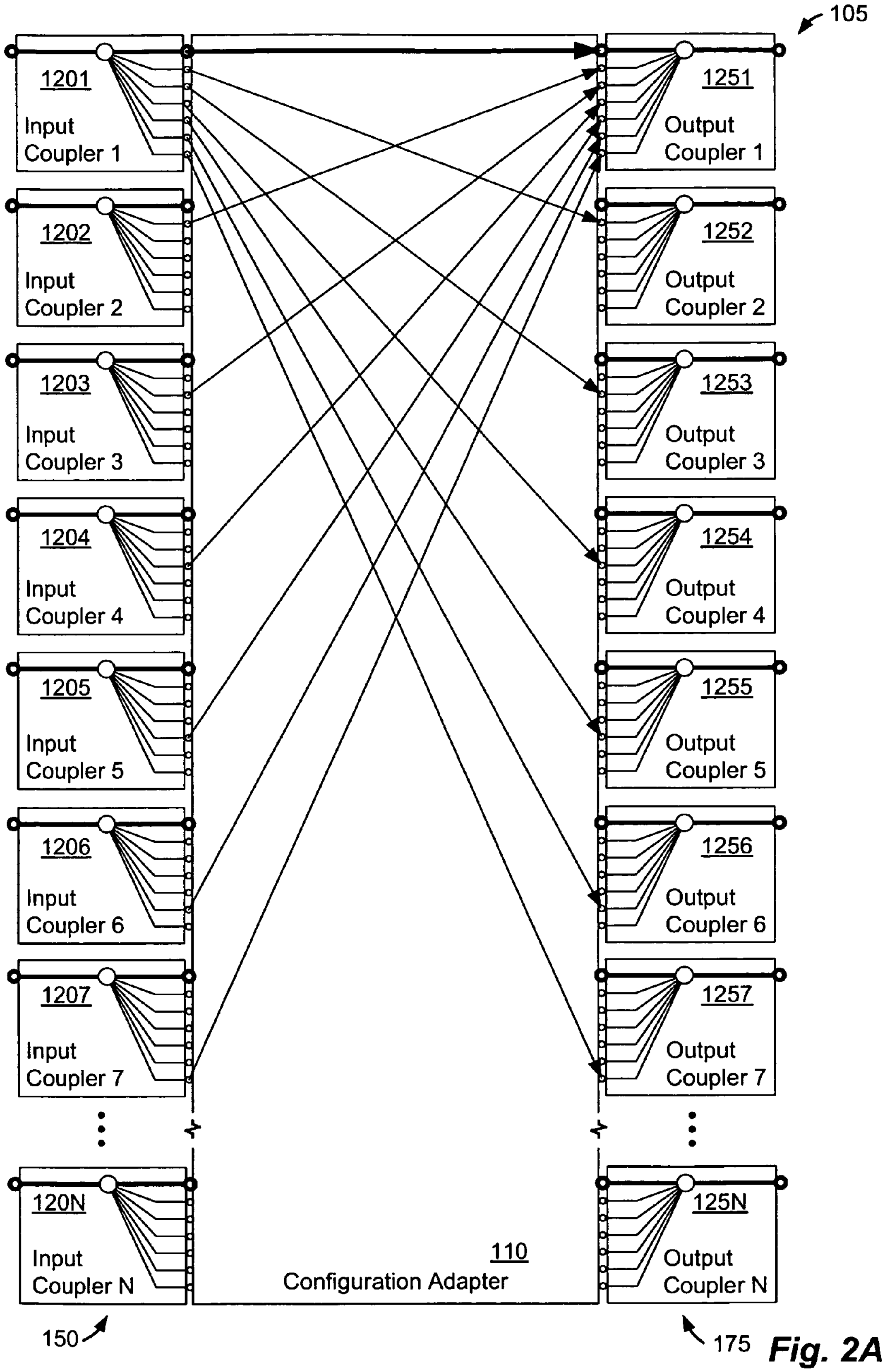
FIG. 2A is a functional block diagram of an exemplary system for dividing, routing, and combining antenna signals in accordance with an embodiment of the present invention.
Figure 2B:
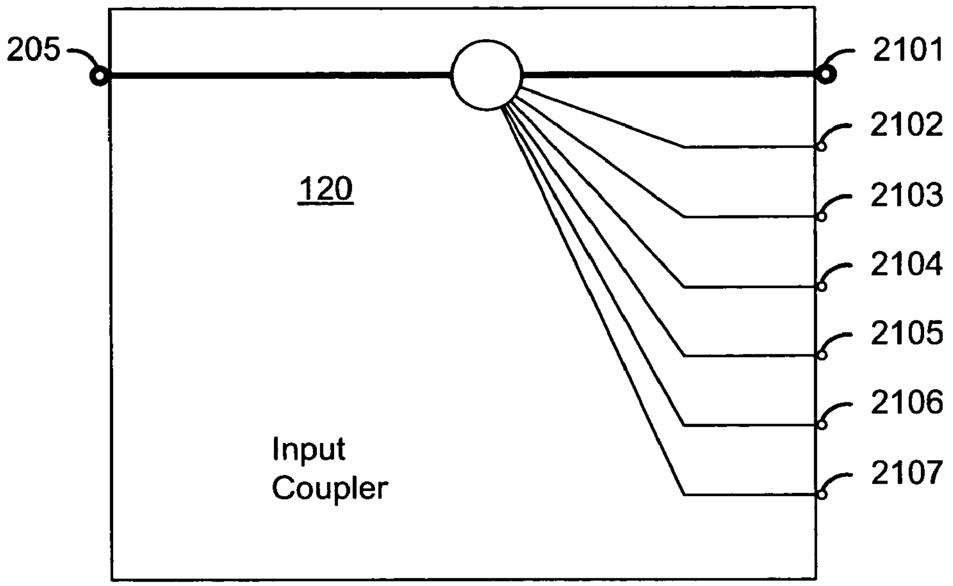
FIG. 2B is a functional block diagram of an exemplary system for dividing an antenna signal into multiple signal components and for feeding those components to a signal routing device in accordance with an embodiment of the present invention.
Figure 2C:
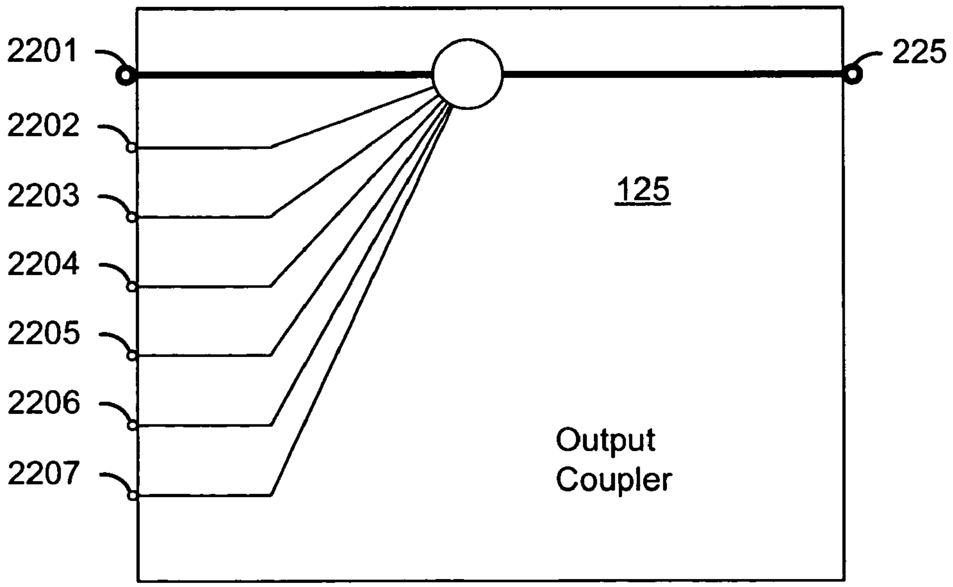
FIG. 2C is a functional block diagram of an exemplary system for receiving multiple antenna signal components from a signal routing device and for combing those components into a unified signal in accordance with an embodiment of the present invention.

Turning now to FIGS. 2A, 2B, and 2C, these figures respectively illustrate, in block diagram form, an exemplary embodiment of the signal mixing system 105 of FIG. 1, one of the input couplers 1201, 1202 . . . 120N of FIG. 1, and one of the output couplers 1251, 1252 . . . 125N of FIG. 1.

FIG. 2A illustrates a functional block diagram of a system 105 for dividing, routing, and combining antenna signals according to an exemplary embodiment of the present invention. FIG. 2B illustrates a functional block diagram of a system 120 for dividing an antenna signal into multiple signal components and for feeding those components to a signal routing device 110 according to an exemplary embodiment of the present invention. The system 120, which can be characterized as an input coupler 120, exemplifies one of input couplers 1201, 1202, 1203, 1204, 1205, 1206, 1207, 120N of FIG. 2A.

FIG. 2C illustrates a functional block diagram of a system 125 for receiving multiple antenna signal components from a signal routing device 110 and for combining those components into a unified signal according to an exemplary embodiment of the present invention. The system 125, which can be characterized as an output coupler 125, exemplifies one of output couplers 1251, 1252, 1253, 1254, 1255, 1256, 1257, 125N of FIG. 2A.

Each input coupler 120/1201, 1202, 1203, 1204, 1205, 1206, 1207, 120N receives signals from a respective phase or amplitude trimmer 115 and splits or divides that received signal into seven components, seven being an exemplary rather than limiting number. The input coupler 120 provides a primary energy path between the input port 205 and the output port 2101 and provides six secondary energy paths that lead to the secondary output ports 2102, 2103, 2104, 2105, 2106, 2107. The output port 2101 typically outputs the majority of the signal energy that enters the input port 205, while the remaining energy is distributed, typically equally, among the secondary output ports 2102, 2103,2104, 2105, 2106, 2107.

In one exemplary embodiment, the output port 2101 outputs a signal that comprises approximately 84 percent of the signal that flows into the input port 205. The input coupler 120/1201, 1202, 1203, 1204, 1205, 1206, 1207, 120N divides the remaining 16 percent among the output ports 2102, 2103, 2104, 2105, 2106, 2107, each receiving approximately 2.7 percent of the total. That ratio of power division is exemplary and can be specified according to application requirements. Accordingly, an exemplary embodiment of the input coupler 120/1201, 1202, 1203, 1204, 1205, 1206, 1207, 120N can tap energy from an incoming signal and feed that tapped energy to the output ports 2102, 2103, 2104, 2105, 2106, 2107, while the remainder of the energy flows exits the output port 2101.

The signal routing device or configuration adapter 110 links each of the output ports 2101, 2102, 2103, 2104, 2105, 2106, 2107 to a different output coupler 1251, 1252, 1253, 1254, 1255, 1256, 1257. The configuration adapter 110 comprises a network of internal or integral waveguides that route signals from each input coupler 1201, 1202, 1203, 1204, 1205, 1206, 1207, 120N to seven different output couplers 1251, 1252, 1253, 1254, 1255, 1256, 1257.

The configuration adapter 110 links the primary output port 2101, which carries the majority of the signal energy, of input coupler one 1201 to the primary input port 2201 of the output coupler one 1251. The configuration adapter 110 also provides respective connections from the secondary output ports 2102, 2103, 2104, 2105, 2106, 2107 of the input coupler one 1201 to: the input port 2202 of output coupler two 1252; the input port 2203 of output coupler three 1253; the input port 2204 of output coupler four 1254; the input port 2205 of output coupler five 1255; the input port 2206 of output coupler six 1256; and the input port 2207 of output coupler seven 1257.

In a similar manner, the configuration adapter 110 links each of the input ports 2201, 2202, 2203, 2204, 2205, 2206, 2207 of each of the output couplers 1251, 1252, 1253, 1254, 1255, 1257, 125N to an output port 2101, 2102, 2103, 2104, 2105, 2106, 2107 of a different input coupler 1201, 1202, 1203, 1204, 1205, 1206, 1207, 120N.

Via the configuration adapter 110, the primary input port 2201 of output coupler one 1251 couples to the primary output port 2101 of input coupler 1201. Further, the secondary input ports 2202, 2203, 2204, 2205, 2206, 2207 of output coupler one 1251 respectively couple to: the output port 2102 of input coupler two 1202; the output port 2103 of input coupler three 1203; the output port 2104 of input coupler four 1204; the output port 2105 of input coupler five 1205; the output port 2106 of input coupler six 1206; and the output port 2107 of input coupler seven 1207.

The output couplers 125/1251, 1252, 1253, 1254, 1255, 1257, 125N combine or add the signals that enter the input ports 2201, 2202, 2203, 2204, 2205, 2206, 2207 to form a signal that exits the output port 225. That resulting signal typically has improved fidelity or quality or exhibits reduced sidelobes as a consequence of the signal mixing performed by the system 105.

Figure 3:
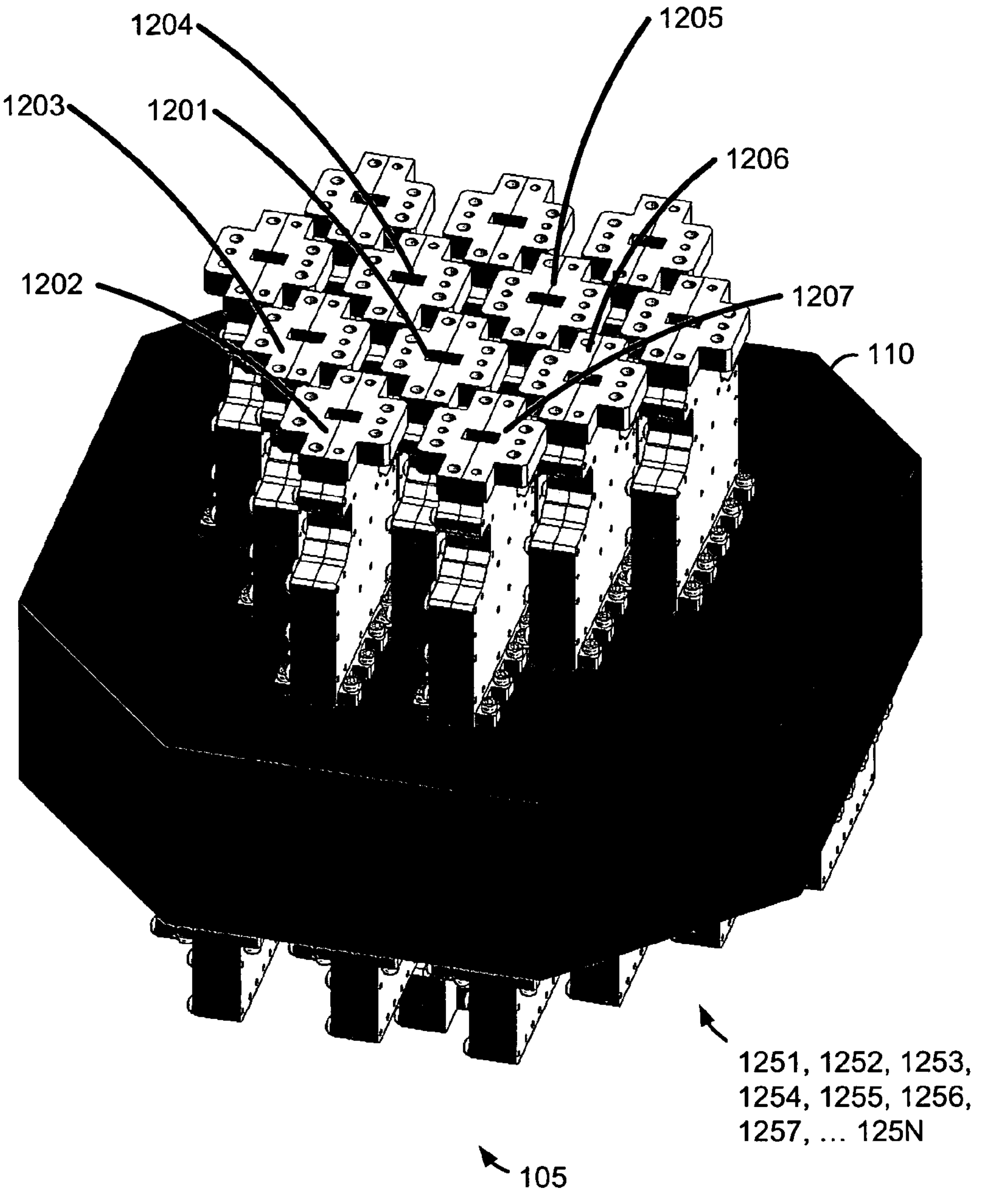
FIG. 3 is an illustration of an exemplary system for dividing, routing, and combining antenna signals in accordance with an embodiment of the present invention.

Turning now to FIG. 3, this figure illustrates a system 105 for dividing, routing, and combining antenna signals according to an exemplary embodiment of the present invention.

More specifically, FIG. 3 depicts an exemplary embodiment of the signal mixing system 105 that FIGS. 1 and 2A illustrate, as discussed above.

Figure 5A:
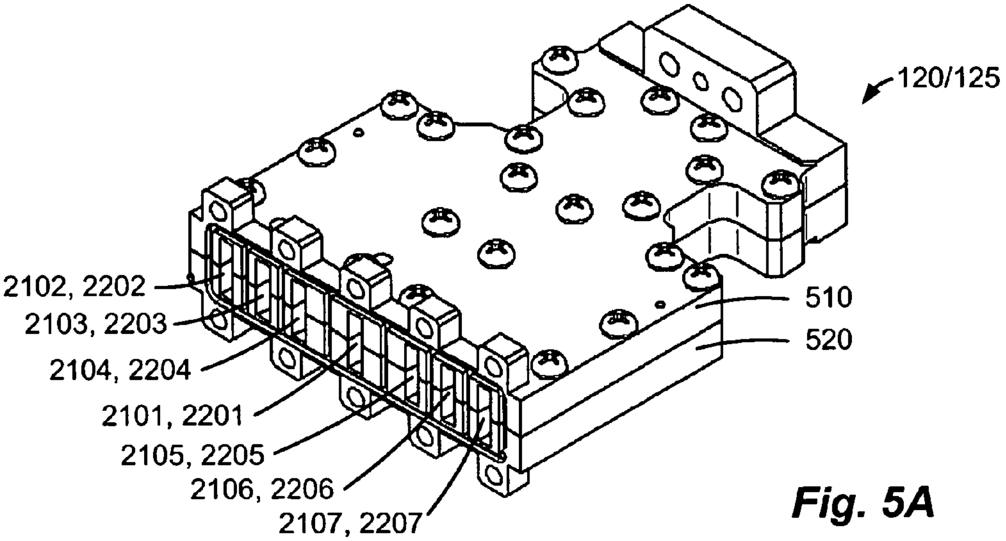
FIG. 5A is an illustration of an exemplary system for splitting or combining antenna signals in accordance with an embodiment of the present invention.
Figure 5B:
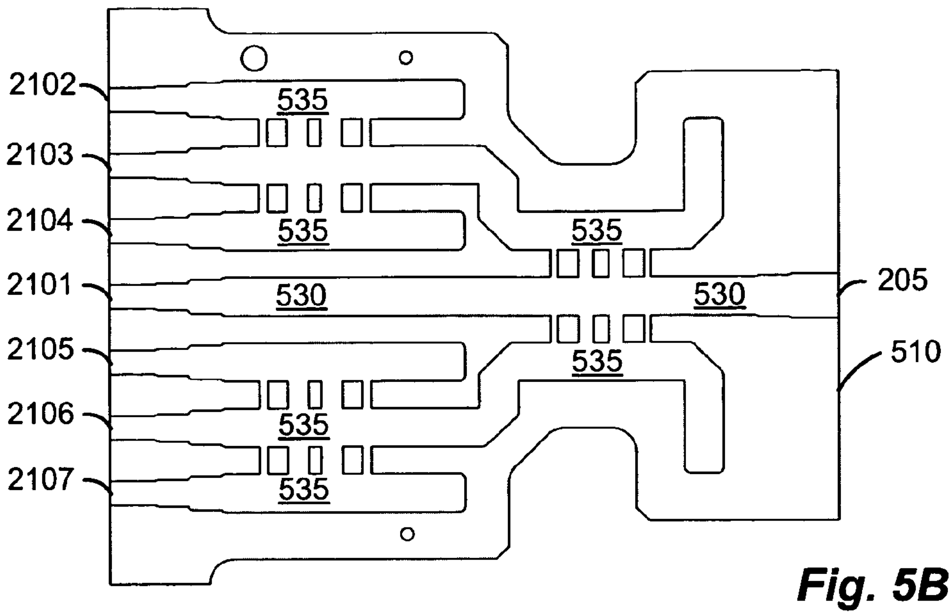
FIG. 5B is an illustration of an exemplary first side of a system for splitting or combining antenna signals in accordance with an embodiment of the present invention.
Figure 5C:
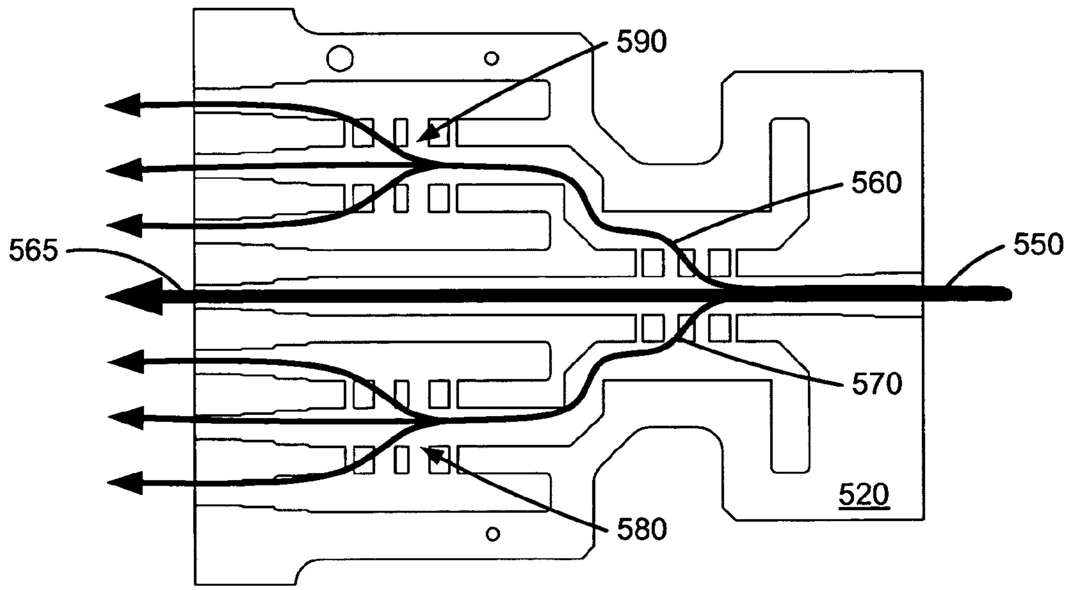
FIG. 5C is an illustration of an exemplary second side of a system for splitting or combining antenna signals in accordance with an embodiment of the present invention.

The system 105 comprises an array of clam-shell-style devices 1201, 1202, 1203, 1204, 1205, 1206, 1207 that exemplify the input couplers 1201, 1202, 1203, 1204, 1205, 1206, 1207 of FIG. 2A. FIGS. 5A, 5B, and 5C, discussed below, provide additional mechanical detail and operational information about the illustrated input coupler embodiments 1201, 1202, 1203, 1204, 1205, 1206, 1207.

Figure 7A:
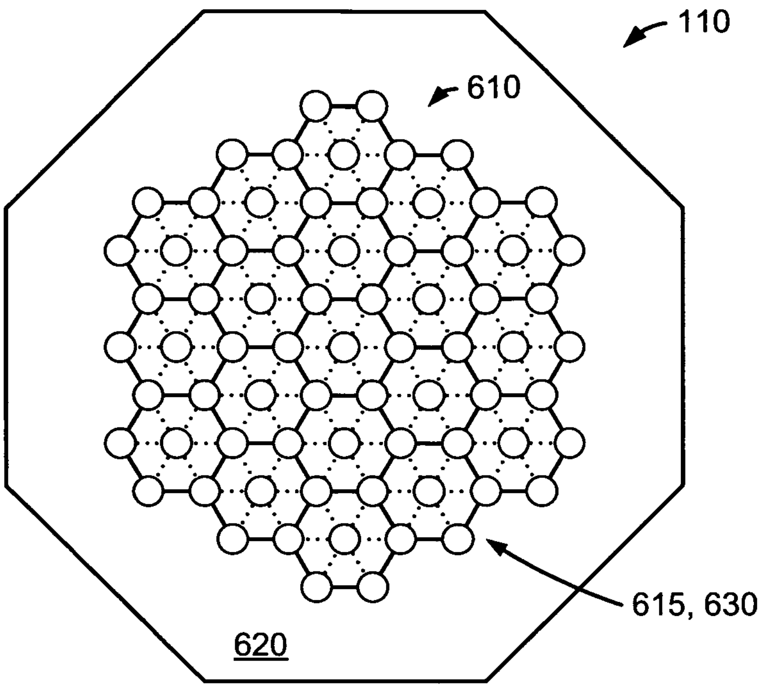
FIG. 7A is an overhead view of an exemplary system for routing antenna signals in accordance with an embodiment of the present invention.
Figure 7B:
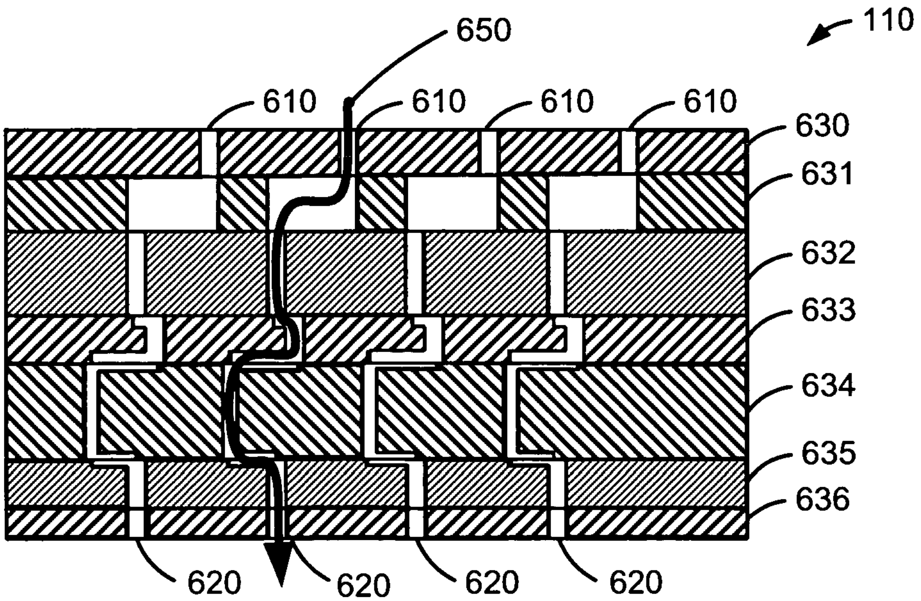
FIG. 7B is a cross sectional view of an exemplary system for routing antenna signals in accordance with an embodiment of the present invention.

The input couplers 1201, 1202, 1203, 1204, 1205, 1206, 1207 are attached to or mounted on one side of an exemplary embodiment of the configuration adapter 110. FIGS. 7A and 7B, discussed below, provide additional mechanical detail and operational information about the configuration adapter 110.

An exemplary array of output couplers 1251, 1252, 1253, 1254, 1255, 1256, 1257 is mounted on the side of the configuration adapter 110 opposite from the input couplers 1201, 1202,1203,1204,1205,1206,1207.

Exemplary embodiments of the present invention can manage signals from an arbitrarily large array of antenna elements 135. Thus, the system 105 can comprise arrays of 10, 50, 100, 500, 1000, or more, or in a range thereof, input couplers 1201, 1202, 1203, 1204, 1205, 1206, 1207, 120N and output couplers 1251, 1252, 1253, 1254, 1255, 1256, 1257, 125N.

Figure 4:
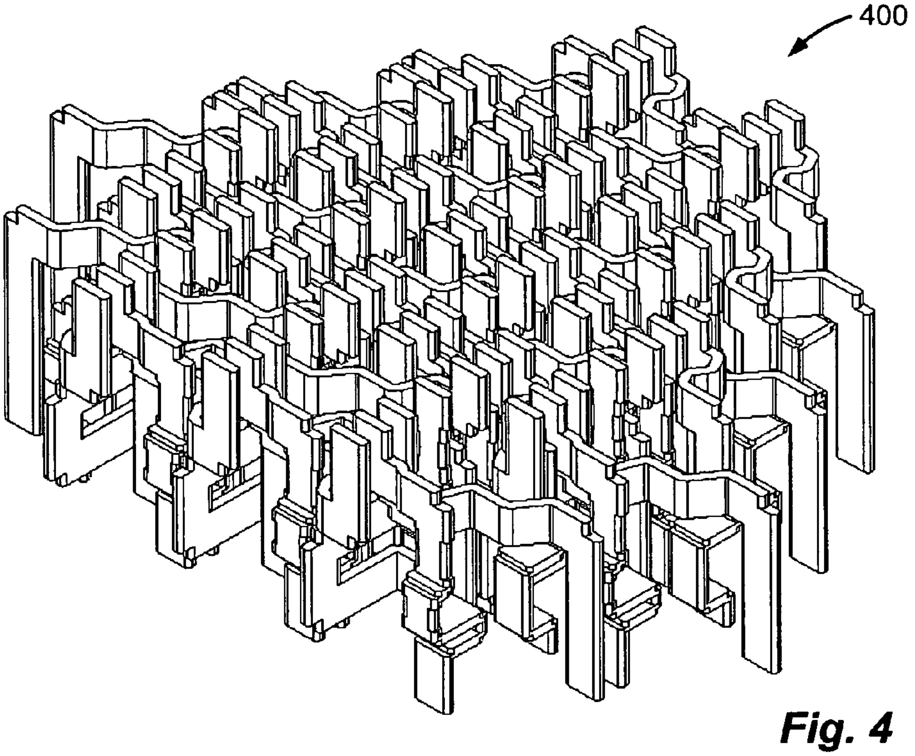
FIG. 4 is an illustration of an exemplary network of waveguide paths of a system for dividing, routing, and combining antenna signals in accordance with an embodiment of the present invention.

Turning now to FIG. 4, this figure illustrates a network 400 of waveguide paths of a system 105 for dividing, routing, and combining antenna signals according to an exemplary embodiment of the present invention. More specifically, FIG. 4 illustrates an exemplary network of paths 400 that convey electromagnetic energy from the input ports 205 of the input couplers 1201, 1202, 1203, 1204, 1205, 1206, 1207, 120N to the output ports 225 of the output couplers 1251, 1252, 1253, 1254, 1255, 1256, 1257, 125N.

Those paths 400 comprise channels through the input couplers 1201, 1202, 1203, 1204, 1205, 1206, 1207, 120N, the configuration adapter 110, and the output couplers 1251, 1252, 1253, 1254, 1255, 1256, 1257, 125N. In other words, FIG. 4 illustrates a guided-wave network made up of sections of waveguide provided by the input couplers 1201, 1202, 1203, 1204, 1205, 1206, 1207, 120N, the configuration adapter 110, and the output couplers 1251, 1252, 1253, 1254, 1255, 1256, 1257, 125N.

At various places, the paths 400 can have a cross section that is circular, square, or rectangular or that may take some other geometric form.

Turning now to FIGS. 5A, 5B, and 5C, an exemplary embodiment of the input coupler 120 and the output coupler 125 will be described. Figure SA illustrates a system 120/125 for splitting or combining antenna signals according to an exemplary embodiment of the present invention. FIG. 5B illustrates a first side 510 of a system 120/125 for splitting or combining antenna signals according to an exemplary embodiment of the present invention. Figure SC illustrates a second side 520 of a system 120/125 for splitting or combining antenna signals according to an exemplary embodiment of the present invention.

In an exemplary embodiment, the illustrated coupler 120/125 can be an input coupler 120 or an output coupler 125 according the direction of the signals 530 flowing there through. Thus, a common module can be fabricated and used for each of the input couplers 1201, 1202, 1203, 1204, 1205, 1206, 1207, 120N and the output couplers 1251, 1252, 1253, 1254, 1255, 1256, 1257, 125N of the signal mixing system 105 discussed above. Moreover, the coupler 120/125 can be viewed as a combining device or a splitting device depending on how it is deployed. Thus the couplers 120/125 can be interchangeable. Nevertheless, in one exemplary embodiment, the input couplers 1201, 1202, 1203, 1204, 1205, 1206, 1207, 120N have distinct features from the output couplers 1251, 1252, 1253, 1254, 1255, 1256, 1257, 125N and lack interchangeability.

The first side 510 and the second side 520 can each be fabricated by milling channels 530, 535 into slabs of metal, such as aluminum, or some other conductive material. Alignment pins and fasteners can provide a mated attachment of the two components 510, 520, one to the other. With the two sides 510, 520 mated together, the mechanical channels 530, 535 match to form guided-wave paths that conduct signals. The channels 530, 535 and associated internal structures can be designed using commercially available waveguide simulation or modeling software or other design techniques known to those skilled in the art.

FIG. 5C illustrates an exemplary distribution of signals 550, 560, 570, 580, 590 through the coupler 120/125, with the device 120/125 functioning as one of the input couplers 1201, 1202, 1203, 1204, 1205, 1206, 1207, 120N and splitting energy. When used as one of the output couplers 1251, 1252, 1253, 1254, 1255, 1256, 1257, 125N, the direction of signal flows reverses with respect to FIG. 5C. In that output coupler configuration, the device 120/125 would combine signals and the illustrated signals 550, 560, 570, 580, 590 would flow from left to right rather than from right to left.

In the illustrated configuration, an antenna signal 550 flows into the input port 205 and propagates in the primary waveguide channel 530. The signal splits into three signal components 560, 565, 570. As discussed above, the center component 565 carries the majority of signal energy, for example about 84 percent. The signal components 565, 570 each carries an equivalent level of signal energy, for example approximately 8 percent of the total. Each of the two signal legs 560, 570 propagates within the coupler 120/125 and is then split 580, 590 into three signal components. Thus, the primary port 2101 emits most of the signal energy 565, and the secondary ports 2102, 2103, 2104, 2105, 2106, 2107 each outputs a fraction of the signal energy.

Figure 6A:
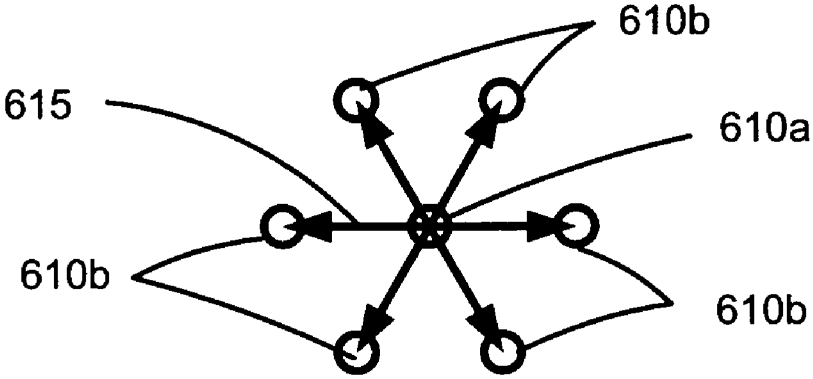
FIG. 6A is an illustration of one signal path coupling energy to six adjacent signal paths in an exemplary system for dividing, routing, and combining antenna signals in accordance with an embodiment of the present invention.

Turning now to FIG. 6A, this figure illustrates one signal path 610*a* coupling energy 615 to six adjacent signal paths 610*b* of a system 105 for dividing, routing, and combining antenna signals according to an exemplary embodiment of the present invention.

The path 610*a* is depicted in a cross sectional type of format, with signals primarily flowing perpendicular (into or out of) to the plane of the drawing page. Thus, the illustrated path 610*a* represents the primary direction of signal flow between an input port 205 of an arbitrary one of the input couplers 1201, 1202, 1203, 1204, 1205, 1206, 1207, 120N and an output port 225 of arbitrary one of the output couplers 1251, 1252, 1253, 1254, 1255, 1256, 1257, 125N. The illustrated paths 610*b* represent paths physically adjacent the path 610*a* and spanning between other input ports 205 and outer output ports 225.

As discussed above, the signal mixing system 110 extracts a portion of the energy flowing in the signal path 610*a* and applies that extracted energy to the adjacent paths 610*b*.

Figure 6B:
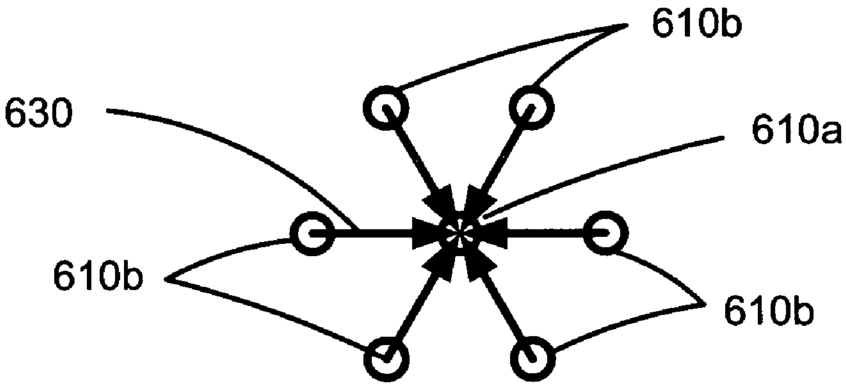
FIG. 6B is an illustration of one signal path receiving energy from six adjacent signal paths in an exemplary system for dividing, routing, and combining antenna signals in accordance with an embodiment of the present invention.

Turning now to FIG. 6B, this figure illustrates one signal path 610*a* receiving energy from six adjacent signal paths 610*b* of a system 105 for dividing, routing, and combining antenna signals according to an exemplary embodiment of the present invention. Whereas FIG. 6A shows the path 610*a* donating signal energy 615, FIG. 6B shows that path 610*a* receiving signal energy 630. In ordinary operation, the path

610*a* concurrently provides signal energy 615 to six adjacent paths 610*b* and receives signal energy 630 from those six adjacent paths 610*b*.

Turning now to FIG. 7A, this figure illustrates an overhead view of a system 110 for routing antenna signals according to an exemplary embodiment of the present invention. More specifically, FIG. 7A illustrates an overhead view of the configuration adapter 110 showing the signal paths 610 (denoted 610*a* and 610*b* in FIGS. 6A and 6B). As discussed above, the signal paths 610 represent the primary routes, which carry the majority of the signal energy, between the input ports 205 and the output ports 225.

FIG. 7A also depicts the paths 615, 630 through which the paths 610 share energy among one another. That is, the dashed and solid lines 615, 630 represent the energy sharing or mixing discussed above and illustrated in FIG. 2A and in FIGS. 6A and 6B. Some of the lines are solid to help show the hexagonal or honeycomb geometry that exists among the primary signal paths 610. In an exemplary embodiment, the sharing or mixing paths 615, 630 each carries a similar or essential equal level of signal energy.

Turning now to FIG. 7B, this figure illustrates a cross sectional view of a system 110 for routing antenna signals according to an exemplary embodiment of the present invention. More specifically, FIG. 7B illustrates a cross sectional view of a representative portion of the configuration adapter 110 shown in FIG. 3 and discussed above.

The configuration adapter 110, which can be viewed as an exemplary embodiment of a signal routing device, comprises seven metallic plates 630, 631, 632, 633, 634, 635, 636 stacked on top of one another and fastened together, for example as laminates. Each of the laminate plates 630, 631, 632, 633, 634, 635, 636 has a pattern of holes and grooves milled, bored, or drilled therein. That is, the configuration adapter 110 includes a stack of metal laminates 630, 631, 632, 633, 634, 635, 636, wherein each laminate comprises holes and grooves that can be formed via a milling operation.

To assembly the configuration adapter 110, the individually-machined laminate plates 630, 631, 632, 633, 634, 635, 636 are stacked on top of one another and fastened or bonded together so that the holes and grooves align with one another. The resulting stack structure 110 comprises a network or array of waveguide channels that route the antenna signals between the input couplers 1201, 1202, 1203, 1204, 1205, 1206, 1207, 120N on one side and the output couplers 1251, 1252, 1253, 1254, 1255, 1256, 1257, 125N on the opposite side.

The laminate plates 630, 631, 632, 633, 634, 635, 636 can comprise alignment pins, protruding out of one laminate 630, 631, 632, 633, 634, 635, 636 and into the adjacent laminate 630, 631, 632, 633, 634, 635, 636. Alternatively, the laminate plates 630, 631, 632, 633, 634, 635, 636 can have some other alignment features such as a shoulder, a tongue-in-groove feature, a male-to-female coupling, or some other mated arrangement.

In one exemplary embodiment, epoxy, glue, adhesive, an organic compound, or some other chemical bonding agent is applied to the mated surfaces of each plate 630, 631, 632, 633, 634, 635, 636 and the laminate plates are clamped together while the chemical bonding agent cures. In this embodiment, the laminate plates 630, 631, 632, 633, 634, 635, 636 can comprise grooves (not shown in FIG. 7B) that carry the chemical bonding agent away from the waveguide openings to prevent the chemical agent from contaminating the waveguide channels. Moreover, the flow channels can help provide an even or uniform distribution of the chemical bonding agent to support precise dimensional tolerances.

In one exemplary embodiment of the present invention, the laminate plates 630, 631, 632, 633, 634, 635, 636 are held together via a diffusion bonding process. In one exemplary embodiment of the present invention, screws, bolts, rivets, or some other mechanical fasteners hold the laminate plates 630, 631, 632, 633, 634, 635, 636 together. The laminate plates 630, 631, 632, 633, 634, 635, 636 can also be held together with solder or through one or more welding bonds.

In one exemplary embodiment of the present invention, braze bonds the laminate plates 630, 631, 632, 633, 634, 635, 636 one to another. Such brazing can comprise vacuum brazing, dipped brazing, etc. One advantage of brazing is the structural support that it provides, particular when the system 105 manages signals from a large number of antenna array elements. Brazing can also provide a desirable conductive path between each of the laminate plates 630, 631, 632, 633, 634, 635, 636. In other words, the laminate plates 630, 631, 632, 633, 634, 635, 636 can be in electrical contact with one another via metal braze.

In one exemplary embodiment, the laminate plates 630, 631, 632, 633, 634, 635, 636 are individually fabricated and are sent to an outside source for contract brazing. A suitable contract brazing vendor is CGR Technologies of Brea, Calif. An exemplary set of brazing specifications is: 1) braze per AWS C3.7 Class A; and 2) age harden to T4 Minimum Hardness per MIL-H-6088G.

The aligned holes and grooves provide waveguide channels that carry electromagnetic or antenna signals 650. FIG. 7B illustrates a representative one 650 of those guide-wave signal flow paths. Those channels provide paths for the sharing or mixing of energy 615, 630 as shown in FIGS. 6A and 6B and discussed above. Moreover, the channels provide a link between the primary output ports 2101 of each input coupler 1201, 1202, 1203, 1204, 1205, 1206, 1207, 120N and the primary input ports 2201 of the corresponding output couplers 1251, 1252, 1253, 1254, 1255, 1256, 1257, 125N.

The signal mixing system 105 illustrated in FIG. 3 and discussed above is assembled from the stack of laminates 110 of FIG. 7B and an appropriate number of input couplers 120/1201, 1202, 1203, 1204, 1205, 1206, 1207, 120N and output couplers 125/1251, 1252, 1253, 1254, 1255, 1256, 1257, 125N. During assemble, the input couplers 1201, 1202, 1203, 1204, 1205, 1206, 1207, 120N, as shown on FIG. 5A, are placed on top of (per the view of FIG. 7B) the laminate stack 110 and are fastened thereto so that the ports 2101, 2102, 2103, 2104, 2105, 2106, 2107 align to the appropriate laminate-stack ports 610.

Similarly, the output couplers 125/1251, 1252, 1253, 1254, 1255, 1256, 1257,125N, as shown on FIG. 5A, are placed under (per the view of FIG. 7B) the laminate stack 110 and are fastened thereto so that the ports 2201, 2202, 2203, 2204, 2205, 2206, 2207 align to appropriate ones of the laminate-stack ports 620.

In one exemplary embodiment of the present invention, the laminate plate 636 is attached to the stack to trim the amplitude and/or phase of the individual guided wave paths of the signal mixing system 105. For example, the laminate plate 636 can be tailored so that the respective paths between each input port 205 of each input coupler 120/1201, 1202, 1203, 1204, 1205, 1206, 1207 and each output port 225 of each output coupler 125/1251, 1252, 1253, 1254, 1255, 1256, 1257, 125N provide matched, aligned, or essentially equal phase and/or amplitude. Having a system or method to vary the individual amplitudes and/or phases of these paths, which FIG. 4 illustrates as discussed above, helps compensate for the manufacturing tolerances of the input couplers 120/1201, 1202, 1203, 1204, 1205, 1206, 1207, 120N, the configuration adapter 110, and the output couplers 125/1251, 1252, 1253, 1254, 1255, 1256, 1257, 125N.

In one exemplary embodiment, the input couplers 120/1201, 1202, 1203, 1204, 1205, 1206, 1207, 120N that will be used in the final assembly 105, shown in FIG. 3 and discussed above, are fabricated and tested. Likewise, the output couplers 125/1251, 1252, 1253, 1254, 1255, 1256, 1257, 125N that will be used in the final assembly 105 are fabricated and tested. The configuration adapter 110 is fabricated, assembled, and tested using the laminate plates 630, 631, 632, 633, 634, 635 (without attaching the trimming laminate plate 636). The final positions of the input couplers 120/1201, 1202, 1203, 1204, 1205, 1206, 1207, 120N and the output couplers 125/1251, 1252, 1253, 1254, 1255, 1256, 1257, 125N on the configuration adapter 110 are specified. An engineer, a technician, or a software program uses the test results and the specified positions to determine the phase and/or amplitude differences among the various paths.

The trimming laminate plate 636 is then fabricated according to these combined test results. When attached to the other laminate plates 630, 631, 632, 633, 634, 635 to form the configuration adapter 110, the trimming laminate plate 636 compensates for and corrects the phase and/or amplitude deviations among the various paths. In other words, the laminated plate 636 is fabricated based on the results of individually testing the various components of the system 105 and compensates for fabrication error, machining tolerances, manufacturing deviation, etc.

The trimming laminate plate 636 can have a thickness selected according to the maximum or gross amount of change in amplitude and/or phase that is desired. Thus, a thicker plate may be adapted to provide a platform for implementing a greater amplitude and/or phase change than a thinner plate. The individual amplitudes and/or phase changes can be implemented based on the width of the waveguide channels that pass through the trimming laminate plate 636. Moreover, the holes of the trimming laminate plate 636 can be dimensioned via a milling operation to provide an appropriately sized waveguide channel that will achieve the respective amplitude and/or phase adjustments. In one exemplary embodiment, the cross sectional areas of those holes are individually set to achieve the amplitude and/or phase. In one exemplary embodiment, the width of those holes are individually set. Accordingly, one or more dimensions of the waveguide channels through the trimming laminate plate can be set to achieve a desired effect.

The trimming laminate plate 636 can be attached to the other plates 630, 631, 632, 633, 634, 635 via brazing as discussed above. Alternatively, the attachment can be made via mechanical fasteners, glues, epoxies, adhesives, etc. so as to avoid disrupting existing brazed bonds.

In one exemplary embodiment of the present invention, two trimming plates are used rather than one. Those two trimming plates can be disposed above and below a stack of bonded stack of laminate plates, for example.

In summary, an exemplary embodiment of the present invention can correct, suppress, cancel, or compensate for sidelobe issues associated with two antenna signals, which may be referred to as a first signal and a second signal. A splitter, coupler, or other device can split each of the first signal and the second signal into a primary component and a secondary component that comprises about 2.7% of the total. The secondary component of the first signal can be applied to or combined with the primary component of the second signal. Likewise, the secondary component of the second signal can be applied to the primary component of the first signal. This mixing or exchange of signal energy can improve signal quality or isolation via suppressing sidelobes of each signal. A network or system that implements the signal mixing can comprise modules that are readily manufacturable. At least some of those modules can be interchangeable with one another.

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is to be limited only by the claims that follow.

What is claimed is:

1. A system for processing electromagnetic beams, comprising:

a first input coupler, operative to:

receive a first electromagnetic beam, comprising energy from a second electromagnetic beam; and split the first electromagnetic beam into a first component and a second component;

a second input coupler, operative to:

receive the second electromagnetic beam, comprising energy from the first electromagnetic beam; and split the second electromagnetic beam into a third component and a fourth component; and a routing device, connected to the first and second input couplers and to a first and a second output coupler, operative to:

receive the first, second, third, and fourth components;

route the first and third components to the first output coupler; and route the second and fourth components to the second output coupler, wherein the first output coupler is operative to receive and combine the first and the third routed components and wherein the second output coupler is operative to receive and combine the second and fourth routed components.

2. The system of claim 1, wherein the routing device comprises a plate with a plurality of channels for guiding the first, second, third, and fourth components.

3. The system of claim 1, wherein the first input coupler, the second input coupler, the first output coupler, and the second output coupler are interchangeable with one another.

4. A system for processing electromagnetic beams, comprising:

a first input coupler, operative to:

receive a first electromagnetic beam, comprising enemy from a second electromagnetic beam; and split the first electromagnetic beam into a first component and a second component;

a second input coupler, operative to:

receive the second electromagnetic beam, comprising energy from the first electromagnetic beam; and split the second electromagnetic beam into a third component and a fourth component;

a routing device, connected to the first and second input couplers and to a first and a second output coupler, operative to:

receive the first, second, third, and fourth components;

route the first and third components to the first output coupler; and route the second and fourth components to the second output coupler, wherein the first output coupler is operative to receive and combine the first and the third routed components and wherein the second output coupler is operative to receive and combine the second and fourth routed components;

a first antenna horn, coupled to the first input coupler, operative to receive the first electromagnetic beam and to pass the first electromagnetic beam to the first input coupler; and a second antenna horn, coupled to the second input coupler, operative to receive the second electromagnetic beam and to pass the second electromagnetic beam to the second input coupler.

5. The system of claim 4, further comprising:

a first amplifier coupled between the first input coupler and the first antenna horn; and a second amplifier coupled between the second input coupler and the second antenna horn.

6. The system of claim 5, further comprising:

a first phase adjuster coupled between the first input coupler and the first amplifier; and a second phase adjuster coupled between the second input coupler and the second amplifier.

7. The system of claim 6, wherein the first phase adjuster is operable to adjust phase and amplitude of the first electromagnetic beam, and wherein the second phase adjuster is operable to adjust phase and amplitude of the second electromagnetic beam.

8. The system of claim 1, wherein the routing device comprises a plate with a plurality of holes defining waveguides for guiding the first, second, third, and fourth components.

9. The system of claim 1, wherein the routing device comprises a stack of plates, each comprising a plurality of holes for guiding the first, second, third, and fourth components.

10. The system of claim 1, wherein the first input coupler, the second input coupler, the first output coupler, and the second output coupler each comprises:

a first metallic member comprising a first channel; and a second metallic member adjacent the first metallic member and comprising a second channel, wherein a waveguide comprises the first channel and the second channel.

11. The system of claim 1, wherein the first input coupler, the second input coupler, the first output coupler, and the second output coupler each comprises at least one waveguide extending along an interface between a first member that is mated with a second member.

12. The system of claim 1, wherein at least one of the first input coupler, the second input coupler, the first output coupler, and the second output coupler comprises:

a first member comprising a first surface; and a second member comprising a second surface adjacent the first surface, wherein a network of waveguides comprises the first surface and the second surface.

13. A system for processing electromagnetic beams, comprising:

a first input coupler, operative to:

receive a first electromagnetic beam, comprising energy from a second electromagnetic beam; and split the first electromagnetic beam into a first component and a second component;

a second input coupler, operative to:

receive the second electromagnetic beam, comprising energy from the first electromagnetic beam; and split the second electromagnetic beam into a third component and a fourth component; and a routing device, connected to the first and second input couplers and to a first and a second output coupler, operative to:

receive the first, second, third, and fourth components;

transmit the first and third components to the first output coupler via waveguide transmission; and transmit the second and fourth components to the second output coupler via waveguide transmission, wherein the first output coupler is operative to receive and combine the first and the third routed components, and wherein the second output coupler is operative to receive and combine the second and fourth routed components.

14. The system of claim 13, wherein the routing device comprises a stack of plates.

15. The system of claim 13, wherein the routing device comprises laminated plates, and wherein a network of waveguides extends through the laminated plates.

16. The system of claim 13, further comprising an antenna horn connected to the first input coupler.

17. A system for processing electromagnetic beams, comprising:

a first input coupler, operative to:

receive a first electromagnetic beam, comprising energy from a second electromagnetic beam; and split the first electromagnetic beam into a first component and a second component;

a second input coupler, operative to:

receive the second electromagnetic beam, comprising energy from the first electromagnetic beam; and split the second electromagnetic beam into a third component and a fourth component; and a routing device, connected to the first and second input couplers and to a first and a second output coupler, operative to:

receive the first, second, third, and fourth components;

route the first and third components to the first output coupler; and route the second and fourth components to the second output coupler, wherein the first output coupler is operative to receive and combine the first and the third routed components and to provide matched phase or matched amplitude, and wherein the second output coupler is operative to receive and combine the second and fourth routed components and to provide matched phase or matched amplitude.

18. The system of claim 17, wherein the first output coupler is operative to provide matched phase and matched amplitude, and wherein the second output coupler is operative to provide matched phase and matched amplitude.

19. The system of claim 17, further comprising an antenna horn connected to an input of the first input coupler.

20. A system for processing electromagnetic beams, comprising:

a first input coupler, operative to:

receive a first electromagnetic beam; and split the first electromagnetic beam into a first component and a second component;

a second input coupler, operative to:

receive a second electromagnetic beam; and split the second electromagnetic beam into a third component and a fourth component; and a routing device, connected to the first and second input couplers and to a first and a second output coupler, operative to:

receive the first, second, third, and fourth components;

route the first and third components to the first output coupler; and route the second and fourth components to the second output coupler, wherein the first output coupler is operative to reduce at least one sidelobe in response to receiving and combining the first and the third routed components, and wherein the second output coupler is operative to reduce at least one other sidelobe in response to receiving and combining the second and fourth routed components.

* * * * *

UNITED STATES PATENT AND TRADEMARK OFFICE

CERTIFICATE OF CORRECTION

PATENT NO. : 7,463,193 B2
APPLICATION NO. : 11/415321
DATED : December 9, 2008
INVENTOR(S) : Brunasso et al.

It is certified that error appears in the above-identified patent and that said Letters Patent is hereby corrected as shown below:

Title page, item [57] Abstract line 8, “received signal into a multiple signal components, such as” should read --received signal into multiple signal components, such as--.

Column 12, Claim 4, line 52, “received a first electromagnetic beam, comprising enemy” should read --received a first electromagnetic beam, comprising energy--.

Signed and Sealed this

Tenth Day of February, 2009

JOHN DOLL
*Acting Director of the United States Patent and Trademark Office*